July 31, 1962  W. W. COX ET AL  3,046,559
PROTECTIVE HELMET LINING
Filed June 24, 1958  4 Sheets-Sheet 1

INVENTORS
WILMA W. COX
CLARA W. COX
BY
Brown, Critchlow, Flick & Peckham
ATTORNEYS

INVENTORS
WILMA W. COX
CLARA W. COX
BY
ATTORNEYS

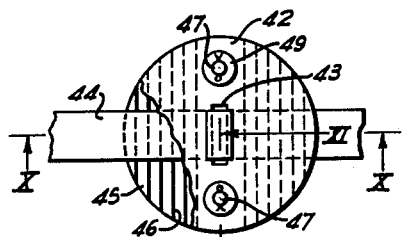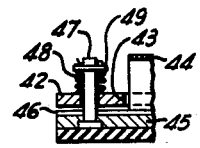
Fig. 9  Fig. 10  Fig. 11
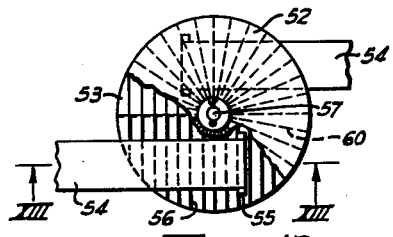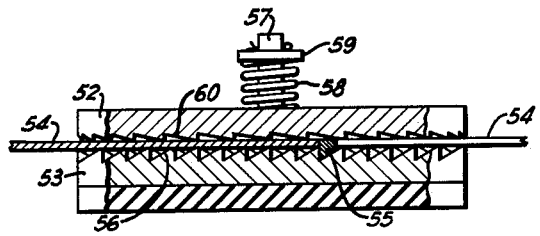
Fig. 12  Fig. 13
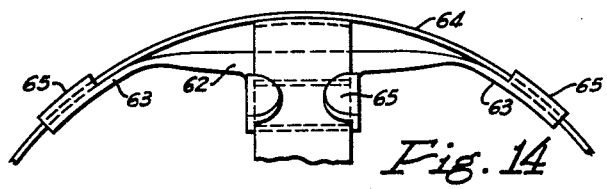
Fig. 14
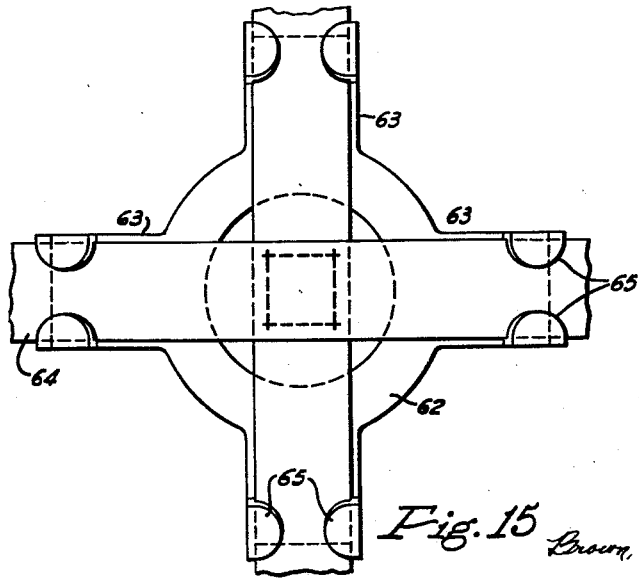
Fig. 15
INVENTORS
WILMA W. COX
CLARA W. COX
BY
Brown, Critchlow, Flick & Peckham
ATTORNEYS July 31, 1962 W. W. COX ET AL 3,046,559

PROTECTIVE HELMET LINING

Filed June 24, 1958 4 Sheets-Sheet 4

INVENTORS
WILMA W. COX
CLARA W. COX
BY
Brown, Critchlow, Flick & Peckham
ATTORNEYS

United States Patent Office 3,046,559
Patented July 31, 1962

3,046,559
PROTECTIVE HELMET LINING
Wilma W. Cox and Clara W. Cox, New York, N.Y., assignors to Mine Safety Appliances Company, Pittsburgh, Pa., a corporation of Pennsylvania
Filed June 24, 1958, Ser. No. 744,240
11 Claims. (Cl. 2—3)

This invention relates to protective helmets or safety hats, and more particularly to means therein for supporting the helmet shell safely on heads of all sizes and shapes.

The well-known protective helmet or hat worn by industrial workers, miners and others, has a rigid shell in which there is a lining or suspension that includes a cradle of straps that fits over the head with the lower ends of the straps connected to the lower part of the shell and their upper ends joined by a crown lace. The purpose of the suspension is to fit the helmet to the head and space the head from the crown of the helmet shell so that impacts against the crown will not be transmitted directly to the head. To accomplish this purpose in the usual suspension, the length of the crown lace, which connects the upper ends of the cradle straps, is adjusted by the wearer so that the shell is disposed in the correct position on his head and a space is provided between his head and the top of the rigid shell. Men with small heads or heads with low crowns tie the crown lace in a small loop so that the helmet and headband do not ride too low on their heads, while men with large heads or heads with high crowns tie the lace in a large loop so that the helmet and headband do not ride too high on their heads. By this adjustment of the crown lace, the distance between the wearer's head and the top of the helmet shell is increased or decreased. It follows that some wearers may loosen the lace to such an extent that their heads will substantially touch the top of the shell, which is a dangerous condition. Also, if a lace happens to break, the wearer's head will touch the shell.

It is among the objects of this invention to provide a protective helmet in which the suspension always provides for a minimum safe distance between the wearer's head and the inside of the crown of the helmet shell, regardless of the size or shape of the wearer's head.

It is also an object of this invention to provide a protective helmet in which the suspension may be adjusted for comfort and safety to increase the space between the wearer's head and the top of the helmet shell without changing the minimum spacing provided by the manufacturer.

It is a further object to provide a protective helmet in which the headband may be adjusted vertically in the helmet shell, either independently or to compensate for crown height adjustments.

In accordance with this invention, the inside of the rigid shell of a helmet is provided with a suspension which is composed of a head cradle attached to a lower portion of the rigid shell, adjustable head-engaging means connected with the cradle, and a vertically adjustable headband connected with the cradle. The straps of the cradle have a fixed length so that a minimum safe distance between the top of the cradle and the inside of the crown of the rigid shell is always maintained. Comfort and correct positioning of the protective helmet while maintaining safety are obtained by a wearer with a small head by means of the adjustable head-engaging means, which raises the helmet shell on the head, and by adjusting the headband vertically and circumferentially.

The invention is illustrated in the accompanying drawings; in which

FIG. 9 is a fragmentary plan view of a further modification;

FIGS. 10 and 11 are horizontal sections taken on the lines X—X and XI—XI, respectively, of FIG. 9;

FIG. 12 is a view similar ot FIG. 9 of another modification;

FIG. 13 is an enlarged vertical section taken on the line XIII—XIII of FIG. 12;

FIG. 14 is a fragmentary side view of another embodiment of the invention;

FIG. 15 is a fragmentary plan view of the suspension shown in FIG. 14;

Figure 1:
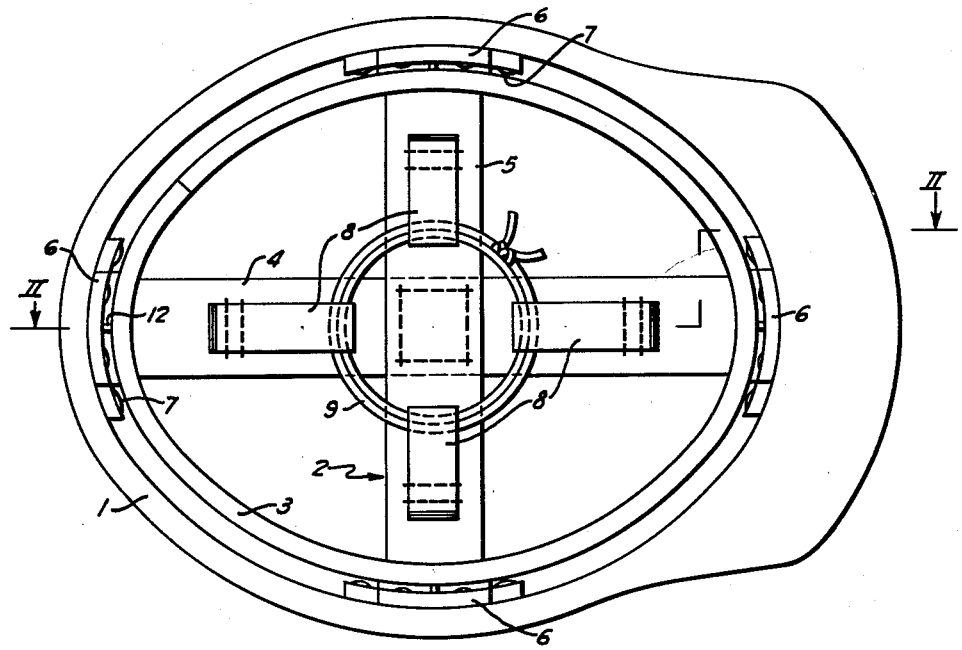
FIG. 1 is a bottom view of a protective helmet including our suspension.
Figure 2:
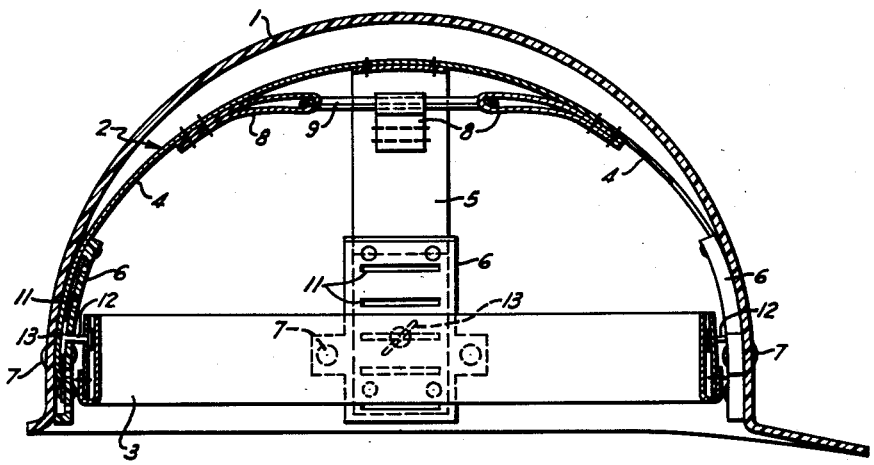
FIG. 2 is a vertical section taken on the line II—II of FIG. 1.

Referring to FIGS. 1 and 2 of the drawings, a rigid helmet shell 1 is formed in the usual manner from any suitable material and may take the form of a cap or a hat. Inside the shell there is a suspension, for supporting the shell, composed of a head-receiving cradle 2 and a headband 3. The cradle is formed from two or more flexible webbing straps 4 and 5 that cross each other at the top and have their lower ends located beside the lower portion of the shell. These lower ends of the straps are riveted to the outer sides of rigid supporting members 6, which in turn are connected to the shell by rivets 7. The length of the straps is such that the top of the cradle is always spaced a predetermined safe distance from the top of the shell, so that impacts against the latter will not be transmitted directly to the head of the wearer. However, since the crown heights of individuals vary considerably, it can be seen that if the top of the cradle were to engage the top of a low crown, the helmet would sit too low on the head. The helmet therefore is provided with means for adjusting the distance that the head can extend up into the shell.

For that purpose flexible loops 8, formed from webbing strips, are secured to the cradle and extend inwardly across it toward one another. Preferably, the outer ends of the loops are riveted or stitched to the cradle straps about half way between the top of the cradle and supporting members 6. A lace 9 is threaded through the loops and has its ends tied together in a knot. By tightening or loosening the lace, the loops will be pulled closer together or allowed to spread farther apart. The closer the loops are pulled together, the less will be the distance that a head will be allowed to extend up into the shell, because the lace and loops will rest on the head. If the loops or lace stretch when a heavy blow is received by the helmet, the cradle straps above the loops will limit the distance that the shell can for forced down on the head and thus the wearer's ears will be protected from the shell. Furthermore, no matter how much the lace is loosened the wearer will not be able to reduce the minimum crown clearance provided by the manufacturer.

Another feature of this invention is that the headband is connected to supporting members 6 in such a way that it can be raised and lowered in the cradle. This is desirable because when the lace 9 is adjusted to change the clearance between the top of the head and the top of the shell, it may be found that the headband does not encircle the head in the most comfortable location. In such cases the elevation of the headband in the shell can be changed. This can be done by providing the supporting members with several vertically spaced transverse slots 11. Rotatably anchored in the outer layer of the headband beside each supporting member is a fastener 12, which extends through the adjacent slot. The outer end of the fastener has a head in the form of a cross piece 13 that is narrow enough to slide through the slot. This cross piece normally is turned at an angle to the slot so that it will hold the fastener in it. The side of the supporting member next to the shell is recessed to form a space for a strap and the fastener head. When it is desired to change the elevation of the headband, the inner ends of the fasteners are turned until their cross pieces can be withdrawn from the slots. The headband then can be raised or lowered and the fasteners inserted in slots at a different level. Of course, a circumferentially adjustable headband is used.

It will be seen that this helmet provides a fixed minimum clearance between the top of the cradle and the top of the shell, but that this clearance can be increased for heads of lower crown height. Also, the headband can be adjusted vertically to the best position for any given wearer of the helmet.

Figure 3:
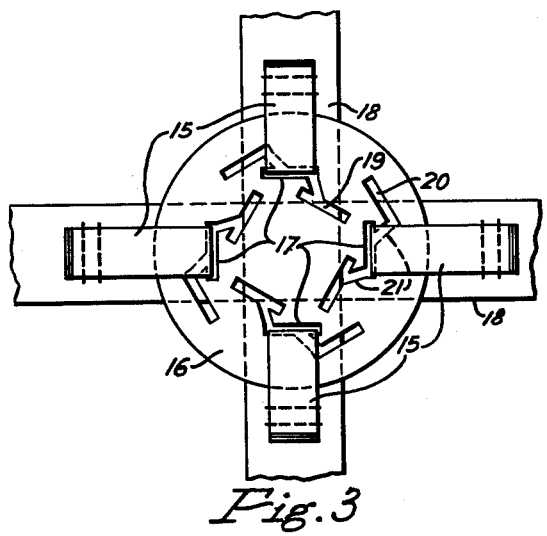
FIGS. 3, 4, 5 and 6 are fragmentary bottom views of suspensions illustrating four different modifications of this invention.

The modified suspension shown in FIG. 3 can be the same as that just described, except that in place of a lace for connecting the looped adjusting strips 15, a disc 16 is used. This disc is provided with a circle or set of circumferentially spaced slots 17 extending transversely of the cradle straps 18. The loops extend through these slots, so that the disc connects the inner ends of the loops together. In order to draw the loops closer together or to allow them to be spread farther apart, the disc is provided with at least one additional circle of slots, two sets being shown. One set 19 forms a circle smaller than the one first described, and the other set 20 forms a circle that is larger. Each set of slots is offset circumferentially from the other sets, and the slots are positioned to extend transversely of the cradle straps when the disc is turned to locate those slots in operative position. The three sets of slots are connected by passages 21 so that the loops can be slid from one set of slots into another. This is done when the disc is turned. A head will extend farthest into the helmet shell when the loops are in the outer slots, and the least distance into the shell when the loops are in the inner slots. The disc may be made of leather or other strong flexible material that will fit comfortably on top of the head.

Figure 4:
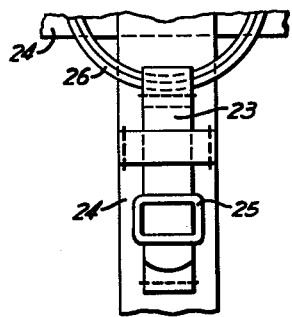

In the form of the invention shown in FIG. 4, adjusting loops are formed by attaching the inner end of a flexible strip 23 to a cradle strap and then doubling the strip on itself and extending it out along the strap and through a buckle 25 also attached to the strap. The inner ends of the loops are connected by a lace or cord 26 that is not intended to be adjusted. Adjustments are made for different crown heights by shortening or lengthening the strips 23 through the medium of the buckles.

Figure 5:
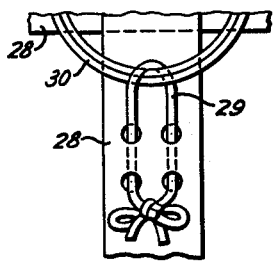

A simpler way of accomplishing what is done in FIG. 4 is to form the adjusting loops from individual laces that are threaded through holes in the cradle straps 28 as shown in FIG. 5, with the ends of each lace 29 tied together. A cord 30 extends through the loops formed by the inner ends of these laces. The loops can be lengthened or shortened by tying their knots in different positions.

Figure 6:
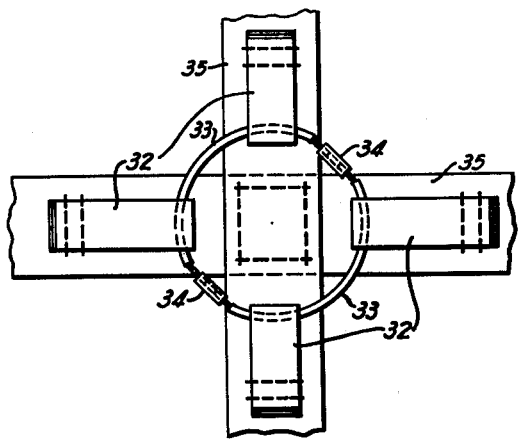

The arrangement shown in FIG. 6 is like that of FIG. 1, except that the lace-like element that connects the inner ends of the adjusting loops 32 does not have ends that are tied together. Instead, it is formed from a pair of short flexible cables 33, the ends of which are threaded and connected by threaded sleeves 34. By turning these sleeves, the ends of the cables can be pulled closer together or spread farther apart to make a corresponding adjustment in the loops attached to the cradle straps 35.

Figure 8:
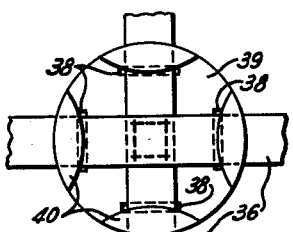
FIG. 8 is a fragmentary plan view taken on the line VIII—VIII of FIG. 7.
Figure 7:
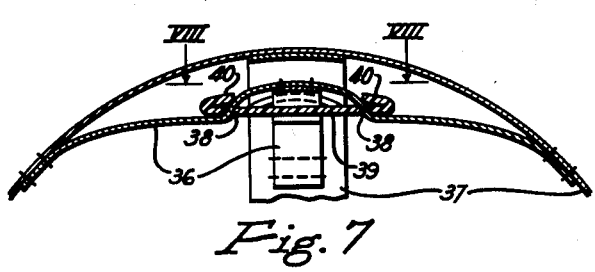
FIG. 7 is a fragmentary vertical section of a further suspension.

The form of invention shown in FIGS. 7 and 8 uses a different principle than that previously described. Instead of having adjusting loops, there are adjusting strips 36 that cross at their center and have their ends secured to the cradle straps 37. Each strip therefore extends entirely across the cradle. The central portions of these strips extend up through narrow slots 38 near the edge of an adjusting member or disc 39, so that the strips extend across the top of the disc. The edge of the disc beside the slots has integral ears or tabs 40 that project back toward the center of the disc on top of it. The inner ends of these tabs overlie the adjacent slots sufficiently to press tightly against the strips extending therethrough. They will therefore resist sliding of the strips down through the slots. To fit this lining to a head with a low crown, the strip loops above the disc are simply pulled upward through the slots to shorten the effective distance between the opposite ends of the strips.

A somewhat similar arrangement is shown in FIGS. 9 to 11, except that two discs and only one slot are used. In this case, an upper disc 42 is provided with a central slot 43, up through which is looped the central portion of an adjusting strip 44, the ends of which are attached to a cradle strap (not shown). To maintain a loop of any desired length, a lower disc 45 engages the lower surface of the strip. This disc preferably is provided with teeth 46 to increase the friction with the strip. The two discs are connected together by a pair of pins 47 extending from the lower disc up through holes in the upper disc at opposite edges of the strip. On each pin a coil spring 48 is compressed between the top of the upper disc and a washer 49 anchored on the upper end of the pin. The two discs therefore are resiliently clamped together, with strip 45 between them. The effective length of the adjusting strip can be reduced by simply pulling its central loop farther up through the upper disc, or be increased by manually spreading the discs sufficiently to permit the loop to be shortened. A pad 50 may be attached to the bottom of the lower disc to rest on the head.

Another double disc adjusting means is shown in FIGS. 12 and 13, but in this case the upper disc 52 is rotated relative to the lower one 53. Also, instead of a continuous adjusting strip extending across the cradle, two strips 54 are used, with only one end of each strip secured to a cradle strap. The inner end portions of the two strips are offset laterally relative to each other on opposite sides of the axis of the adjuster. Secured to the inner end of each strip is a small hook-like member 55 that fits between teeth 56, with which the upper surface of the lower disc is provided. The teeth at one side of the disc face in one direction and those at the other side face in the opposite direction. A pivoted pin 57 is mounted in the lower disc and extends up through a hole in the center of the upper disc so that the latter can be turned. The two discs are pressed tightly toward each other by a coil spring 58 on the pivoted pin, compressed between the top of the upper disc and a washer 59 on the upper end of the pin. The lower surface of the upper disc is provided with radial teeth 60 for gripping the upper surfaces of the two strips. When it is desired to shorten the effective length of the adjusting strips, the upper disc is turned in counterclockwise direction as viewed in FIG. 12. Its teeth will pull the strips ahead, with their end hooks riding over the teeth on the lower disc. Friction between the discs and the strips will then prevent the discs from turning back relative to the strips. To lengthen the strips, the upper disc must be raised so that the inner ends of the strips can be moved back across the lower disc.

In the embodiment of the invention shown in FIGS. 14 and 15, the adjusting means for crown clearance takes the form of a somewhat flexible plastic member that has a circular central portion 62 for resting on top of the head, It also has radially extending arms 63 engaging the lower surface of a cradle strap 64 at opposite sides of the top of the cradle. The outer ends of these arms are provided with integral ears 65 that overlie the upper surface of the strap and pinch it tightly against the underlying arms. To adjust this cradle for lower crown heights, the cradle strap between the ears is pulled upwardly with sufficient force to slide it upward beneath the ears. This will lower the adjusting member in the cradle. Friction between the adjusting member and the strap is sufficient to hold that member in the new position.

Figure 16:
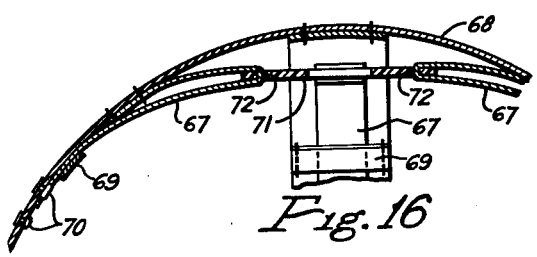
FIG. 16 is a fragmentary vertical section through another embodiment of the invention.
Figure 17:
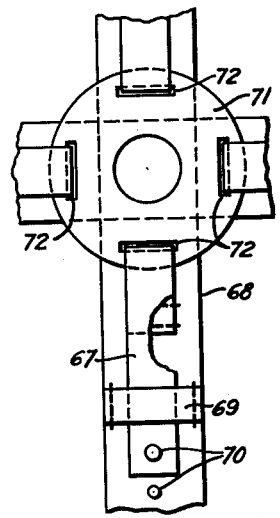
FIG. 17 is a fragmentary bottom view of FIG. 16.

The adjusting loops shown again in FIGS. 16 and 17 are similar to the ones shown in FIG. 4. That is, the inner end of a flexible strip 67 is secured to a cradle strap 68 and then doubled upon itself and extended outwardly between the strap and a cross piece 69 stitched to it. The lower end of the strip is fastened to the strap by a stud or snap fastener 70, there being at least two such fasteners so that the effective length of the loop can be changed. The inner ends of the loops are connected by a flexible disc-like member 71 provided with slots 72, through which the strips extend.

Figure 18:
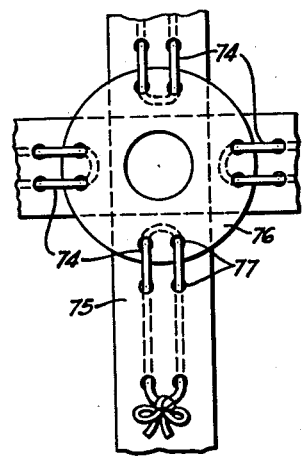
FIG. 18 is a view similar to FIG. 17 of a further modification.

FIG. 18 illustrates the same type of adjustable loops as shown in FIG. 5, formed from laces 74 tied into the cradle strap 75. However, their inner ends are connected by a flexible disc 76 provided with holes 77, through which the loops extend.

Figure 19:
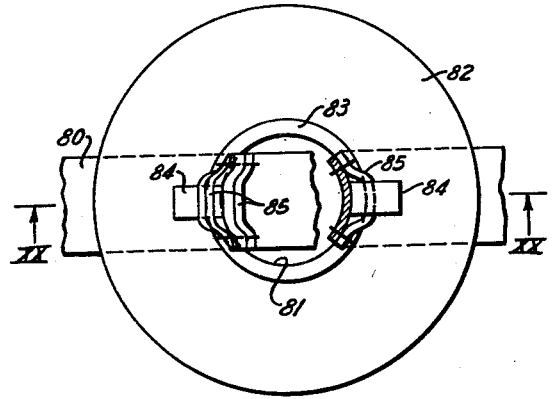
FIG. 19 is a fragmentary plan view of still another embodiment.
Figure 20:
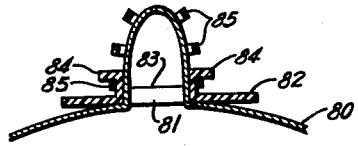
FIG. 20 is a vertical section taken on the line XX—XX of FIG. 19.

A final form of the invention is shown in FIGS. 19 and 20. In this case a continuous adjusting strip 80, the ends of which are secured to a cradle strap (not shown), has a central loop that extends up through a central hole 81 in an adjusting member 82. The top of this member is provided with an integral collar 83 encircling the opening and having a pair of short integral tongues 84 projecting from its upper end in opposite directions out along the strip. The loop of the strip has narrow bands 85 extending across it and attached to it at their opposite ends. These bands are spaced suitable distances apart. Any desired length of loop can be pulled up through the adjusting member and retained there by slipping a pair of the bands beneath the tongues to prevent the loop from being shortened.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. The combination with a helmet shell, of a head cradle therein formed from straps having lower ends adjoining the lower part of the shell, supporting members overlying said lower ends and engaging the shell means connecting the straps and supporting members and shell together, each member being provided with a plurality of vertically spaced horizontal slots, a headband inside the cradle beside the supporting members, and rotatable fastening elements anchored in the headband and extending through some of said slots, the outer end of each element having a cross piece extending above and below a slot to hold the element therein, said elements being rotatable to turn said cross pieces into line with the slots to permit them to be removed therefrom and inserted in other slots at a different elevation.

2. A helmet shell lining comprising straps radiating outward and downward from a central point and having upper inner portions and lower outer head-engaging portions, means connecting the upper portions of the straps together to form a head cradle, means adapted to attach the lower portions of the straps to the lower part of a helmet shell to space the top of the cradle from the top of the shell, a headband positioned below said head-engaging portions of the straps, means connecting the headband with the lower part of the cradle, and adjustable means connected with said head-engaging portions of the straps at points spaced above the headband for pulling said portions together to reduce the interior height of the cradle, said adjustable means being in addition to said first-mentioned connecting means.

3. A helmet shell lining comprising straps radiating outward and downward from a central point and having upper inner portions and lower outer head-engaging portions, means connecting the upper portions of the straps together to form a head cradle, means adapted to attach the lower portions of the straps to the lower part of a helmet shell to space the top of the cradle from the top of the shell, a headband positioned below said head-engaging portions of the straps, means connecting the headband with the lower part of the cradle, loops carried by said head-engaging portions of the straps and spaced above the headband but below said first-mentioned connecting means, the loops being spaced apart, and an adjustable connecting member extending through the loops for pulling them closer together below the top of the cradle to reduce the interior height of the cradle.

4. A helmet shell lining comprising a head cradle adapted to fit over the head for support thereby, means for connecting the lower part of the cradle to a helmet shell in a position to space the top of the cradle from the top of the shell, a headband, means for detachably locking the headband to the cradle at different distinct elevations in the cradle, and adjustable means connected with said cradle above the headband to reduce the usable height of the lining, said adjustable means being supplemental to the cradle.

5. A helmet shell lining comprising a head cradle including straps, means adapted to connect them to a helmet shell, means for adjusting the height of the cradle, separate supporting members secured to the lower portions of the straps, a headband, and means for detachably connecting the headband to the cradle straps through said supporting members in locked relation at different distinct elevations in the cradle.

6. A helmet shell lining comprising a head cradle formed from straps and means adapted to connect them to the lower part of a helmet shell, flexible loops attached to the upper portion of the cradle and extending inwardly toward one another along the underside of the straps, an adjustable connecting member extending through the loops for pulling them closer together and creating slack in the upper portion of the cradle between the points of attachment of the loops thereto, a headband, and means for detachably fastening the headband to the cradle straps at different distinct elevations in the cradle.

7. A helmet shell lining comprising a flexible head cradle having a fixed maximum height and formed from straps having means to connect them to a helmet shell in a position to space the top of the cradle a fixed minimum distance from the top of the shell when the cradle is fully expanded, separate supporting members overlying the lower ends of the straps and secured to the shell, each supporting member being provided with a plurality of vertically spaced horizontal slots, a headband inside the cradle beside the supporting members, rotatable fastening elements anchored in the headband and extending through some of said slots, the outer end of each element having a cross piece extending above and below a slot to hold the element therein, said elements being rotatable to turn said cross pieces into line with the slots to permit them to be removed therefrom and inserted in other slots at a different elevation, and adjustable means connected with said straps above the headband to reduce the usable height of the lining, said adjustable means being supplemental to the cradle.

8. A helmet shell lining as recited in claim 3, in which said adjustable connecting member is a disc provided with a set of circumferentially spaced slots receiving the loops to connect them, the disc being provided with another set of similar slots spaced a different distance from the center of the disc, and the two sets of slots being connected by passages to permit said loops to be transferred from one set to the other when the disc is turned.

9. A helmet shell lining as recited in claim 2, in which said adjustable means include a flexible strip secured at its ends to said straps at opposite sides of said central point, and adjustment means mounted on a portion of said strip and provided with openings through which the strip frictionally extends to form a loop above said adjustment means that can be enlarged to lower the strip.

10. A helmet shell lining as recited in claim 2, in which said adjusting means includes adjustable length flexible loops carried by said head-engaging portions of the straps and spaced above the headband but below said first-mentioned connecting means, the loops extending inwardly toward one another and being spaced apart, and a connecting member extending through the inner ends of the loops.

11. A helmet shell lining as recited in claim 2, in which said adjusting means is a head-engaging member below the top of the cradle and extends in opposite directions below said central point, the opposite ends of said member being provided with means engaging the upper surfaces of said straps and clamping them against said member, said straps being manually slidable past said clamping means to lower said member in the cradle.

References Cited in the file of this patent

UNITED STATES PATENTS

| | | |
|---|---|---|
| 1,770,376 | Bullard | July 15, 1930 |
| 2,342,501 | Strauss | Feb. 22, 1944 |
| 2,359,387 | Riddell | Oct. 3, 1944 |
| 2,398,561 | Ruggiero | Apr. 16, 1946 |
| 2,735,099 | Lewis | Feb. 21, 1956 |
| 2,796,609 | Fisher et al. | June 25, 1957 |

FOREIGN PATENTS

| | | |
|---|---|---|
| 192,630 | Great Britain | Feb. 8, 1923 |